United States Patent [19]

Nakamichi et al.

[11] Patent Number: 5,561,658
[45] Date of Patent: Oct. 1, 1996

[54] FRICTION DRIVE FOR A DISC PLAYER

[75] Inventors: Niro Nakamichi, Tokyo; Tadao Yamanouchi, Saitama, both of Japan

[73] Assignee: Nakamichi Corporation, Tokyo, Japan

[21] Appl. No.: 384,563

[22] Filed: Feb. 6, 1995

[30] Foreign Application Priority Data

Feb. 6, 1994 [JP] Japan ................................. 6-032961
Feb. 6, 1994 [JP] Japan ................................. 6-032962

[51] Int. Cl.⁶ ............................................. G11B 23/00
[52] U.S. Cl. ........................ 369/263; 369/267; 369/270
[58] Field of Search .................................. 369/258, 259, 369/262, 263, 264, 266, 267, 270, 271

[56] References Cited

U.S. PATENT DOCUMENTS

| | | | |
|---|---|---|---|
| 2,949,308 | 8/1960 | Maxim | 369/266 |
| 3,047,297 | 7/1962 | Drake | 369/263 |
| 3,833,225 | 9/1974 | Pettersson | 369/266 |
| 3,993,315 | 11/1976 | Hansen et al. | 369/263 |
| 4,766,587 | 8/1988 | Dons et al. | 369/263 |
| 5,373,495 | 12/1994 | Takada | 369/266 |
| 5,463,613 | 10/1995 | Forsell | 369/266 |

Primary Examiner—Georgia Y. Epps
Assistant Examiner—P. W. Huber
Attorney, Agent, or Firm—Morrison Law Firm

[57] ABSTRACT

A disc player both translates and rotates a disc using a pair of parallel drive belts contacting opposed edges of a disc. Each drive belt spans a drive pulley and a passive driven pulley. The pulleys are supported on one of two sliding plates. The sliding plates are connected by a pair of pantograph-type rotatable mounting arms such that movement of one drive belt toward the disc forces the other drive belt to move an equal amount toward the disc. Each drive pulley is driven by a motor causing the drive belt to revolve. A spanning portion of each drive belt is urged against the edge of the disc, thereby establishing friction engagement between the belts and the disc such that the disc rotates when the belts rotate. A disc advance control system moves the disc linearly through an optical beam by differing the rotational frequency of one belt relative to the other. Disc advance may be accomplished with, or without, disc rotation. The position of the belts at opposed locations about the circumference of the disc cancels out any linear pressure applied by the belts.

18 Claims, 8 Drawing Sheets

FRICTION DRIVE FOR A DISC PLAYER

BACKGROUND OF THE INVENTION

The present invention relates to a friction drive for playing discs. More specifically, the present invention relates to dual drive belt disc drive which rotates the disc.

In Japanese Patent Application No. 5-217033, the present applicant disclosed wrapping a single drive belt around a disc. When the belt was driven by an outside source, the disc rotated due to friction between the belt and the outer rim of the disc.

The above technology was utilized in Japanese Patent Application No. 5-316085, in which an independent drive source is used to move a disc through an optical beam of a stationary optical head.

A drawback of the prior art is that tension from a single drive belt applies uncompensated lateral pressure to the rim of a disc. This pressure may interfere with rotation of the disc, or dislodge it completely. A further drawback is that independent drive mechanisms are required for disc rotation and linear movement through the optical beam. The additional hardware and control systems needed to support two drive systems results in an increased size, complexity and cost.

OBJECTS AND SUMMARY OF THE INVENTION

Accordingly, it is an object of the invention to provide a disc playback device which overcomes the drawbacks of the prior art.

It is a further object of the invention to provide a disc playback device which utilizes a drive belt configuration that offsets lateral pressure exerted by each drive belt.

It is a still further object of the invention to provide a disc playback device which adjusts the rotation speed of the drive belts to move a disc through an optical beam.

Briefly stated, the present invention provides a disc player which both translates and rotates a disc using a pair of parallel drive belts contacting opposed edges of a disc. Each drive belt spans a drive pulley and a passive driven pulley. The pulleys are supported on one of two sliding plates. The sliding plates are connected by a pair of pantograph-type rotatable mounting arms such that movement of one drive belt toward the disc forces the other drive belt to move an equal amount toward the disc. Each drive pulley is driven by a motor causing the drive belt to revolve. A spanning portion of each drive belt is urged against the edge of the disc, thereby establishing friction engagement between the belts and the disc such that the disc rotates when the belts rotate. A disc advance control system moves the disc linearly through an optical beam by differing the rotational frequency of one belt relative to the other. Disc advance may be accomplished with, or without, disc rotation. The position of the belts at opposed locations about the circumference of the disc cancels out any linear pressure applied by the belts.

According to an embodiment of the invention, there is provided a friction device for rotating a disc in a disc player, comprising: at least first and second drive belts, at least first and second means for driving the at least first and second drive belts, respectively, means for rotatably supporting the disc, means for reading the disc, and the at least first and second drive belts contacting at least first and second portions of a rim of the disc such that the disc rotates responsive to the at least first and second means for driving.

According to a feature of the invention, there is provided a device for rotating a disc, comprising: first and second flexible continuous loop elements, the disc having an outer edge, first and second means for revolving the first and second loop elements, respectively, means for rotatably supporting the disc, means for engaging the first and second loop elements with the outer edge when the loop elements revolve, whereby the disc is rotated, and control means for changing a rotational frequency of the first and second loop elements.

According to a further feature of the invention, there is provided a device for rotating a disc, comprising: first and second drive belts, each of the first and second drive belts wrapping around first and second pulley sets, each pulley set including a drive pulley and a passive pulley, the first and second pulley sets being slidably mounted on first and second plates, the first and second plates being connected such that movement in a direction of one of the plates causes a corresponding equal and opposite movement in the other of the plates, the first and second plates having a playback position where the first and second drive belts engage an outer rim of the disc, means for moving the first and second plates to the playback position, and control means for adjusting the rotational frequency of the first and second drive pulleys.

According to a further feature of the invention, there is provided a disc drive comprising: first and second belts, means for moving the first and second belts into contact with opposed edges of a disc, disc rotation means for driving contact points of the first and second belts with the disc at the same speed, and in opposite directions, whereby the disc is rotated without translation, and disc advance means for changing a speed of the first belt in a first direction at its contact point and for changing a speed of the second belt at its contact point in a second direction by substantially the same amount, whereby the disc is translated.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
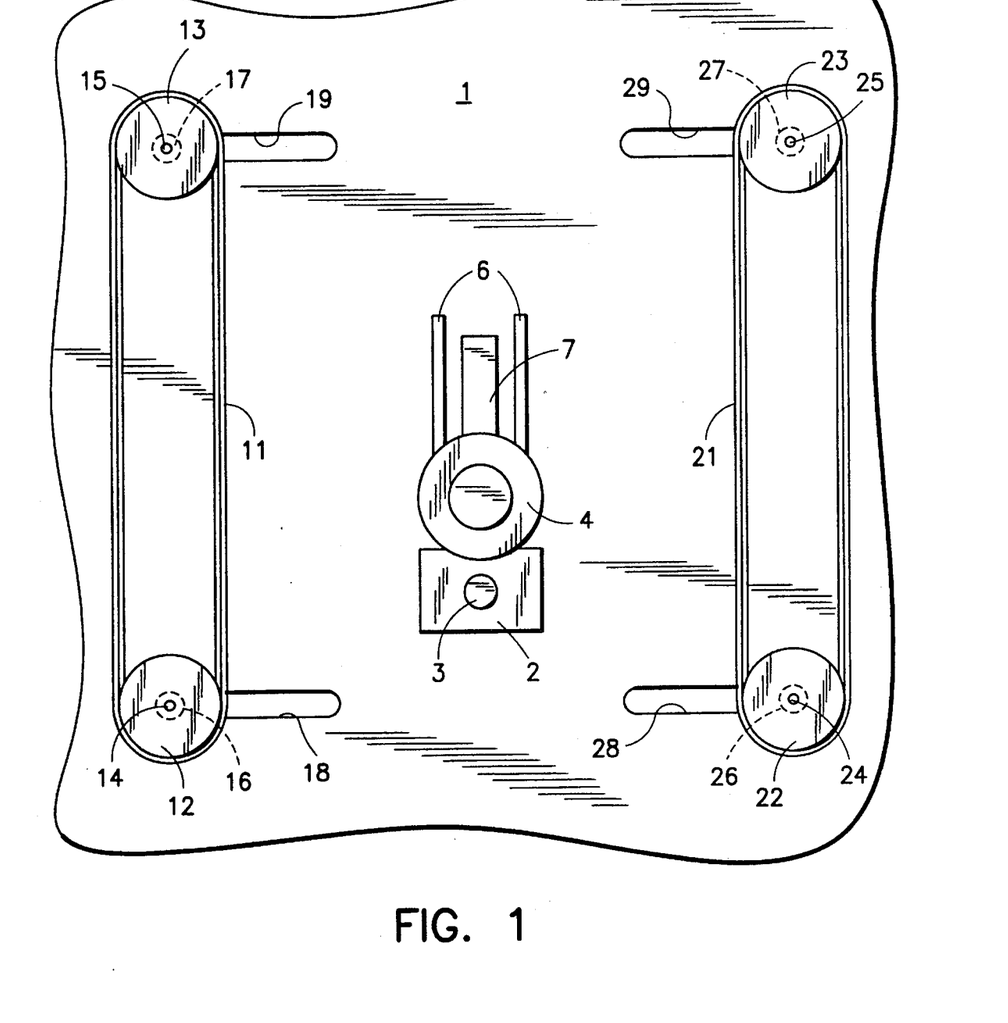
FIG. 1 is a top view of portions of a disc playback device, according to an embodiment of the present invention.
Figure 2:
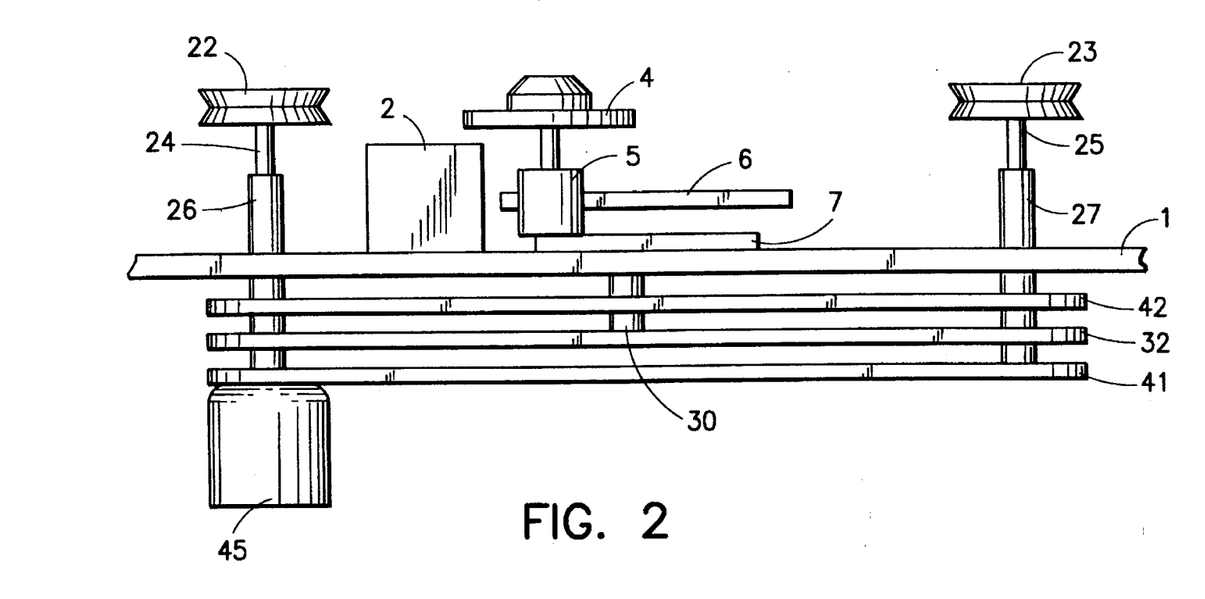
FIG. 2 is a side view of a disc playback device, according to an embodiment of the present invention.

Referring to FIGS. 1 and 2, a compact disc player 1 includes a turntable 4 for rotatably supporting a disc (not shown). Turntable 4 is attached to the top of a turntable support 5. Turntable support 5 can move frontward and rearward along a pair of guide shafts 6 (the top and bottom of FIG. 1 are the rear and front, respectively, of the present invention). An object lens 3, mounted on a stationary optical pick-up 2, projects a laser spot on to a disc to read data contained in spiral tracks therein. As the optical lens 3 reads the data on the disc, turntable support 5 moves relative to optical pick-up 2 along guide shafts 6. A potentiometer 7, disposed in the path of turntable support 5, changes its output voltage responsive to the radial position of turntable 4 along guide shafts 6. A voltage produced by potentiometer 7 is used, as is conventional, to detect movement of the disc during initial attempts to phase lock the tracking servo with the data from the disc.

Dual continuous rubber drive belts 11 and 21, disposed parallel to each other, are mounted on drive pulleys 12 and 22 and passive pulleys 13 and 23, respectively.

Figure 4:
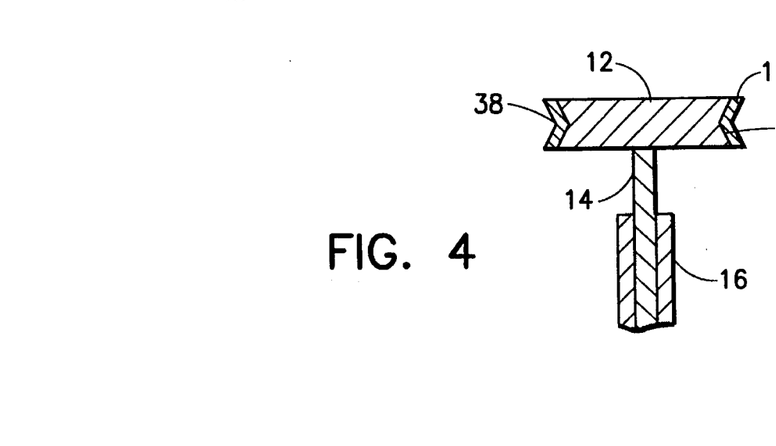
FIG. 4 is a cross-section side view of drive pulley 12.

Referring momentarily to FIG. 4, drive belt 11 has a V-shaped cross-section (although not shown, drive belt 21 also has a V-shaped cross-section). An inner apex of drive belts 11 and 21 engage the rim of a disc during play mode. The triangular shape 38 formed by the outer portion of drive belt 11 wraps around a V-shaped groove 37 along the circumference of pulleys 12 and 13. Drive belt 21 similarly wraps around pulley 22 and 23.

Returning now to FIGS. 1 and 2, drive pulley 12 and passive pulley 13 are supported by rotation shafts 14 and 15. Rotation shafts 14 and 15 are in turn supported by cylindrical bearings 16 and 17, respectively.

Figure 3:
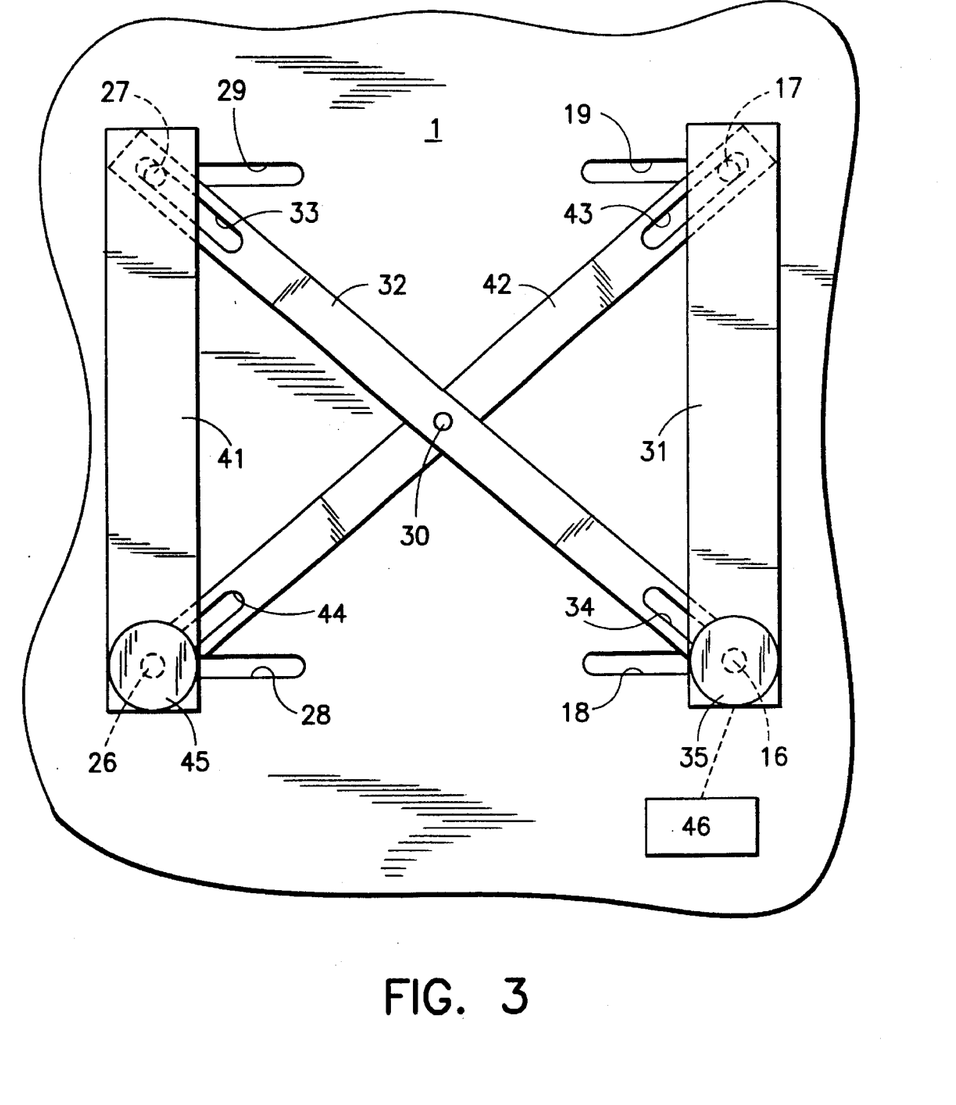
FIG. 3 is a bottom view of a disc playback device, according to an embodiment of the present invention.

Referring now also to FIG. 3, bearings 16 and 17 are attach to a sliding plate 31. Bearings 16 and 17 engage elongated slots 18 and 19, respectively. Drive pulley 22, passive pulley 23, rotation shafts 24 and 25, cylindrical bearings 26 and 27, a sliding plate 41, and slots 28 and 29 are aligned identically to the configuration of FIG. 2.

A pair of pantograph-type mounting arms 32 and 42 are rotatably fixed to each other at their midpoints by a shaft 30. Mounting arm 32 has elongated slots 33 and 34 which engage bearings 27 and 16, respectively. Similarly, mounting arm 42 has elongated slots 43 and 44 which engage bearings 17 and 26, respectively.

When the device enters a play mode, a drive source 46 moves sliding plate 31 along slots 18 and 19 toward turntable 4. Movement of sliding plate 31, and bearings 16 and 17 attached thereto, rotate mounting arms 32 and 42 about shaft 30. The rotation of mounting arms 32 and 42 pushes bearings 26 and 27 toward turntable 4, thereby moving sliding plate 41 symmetrically with sliding plate 31.

Figure 6:
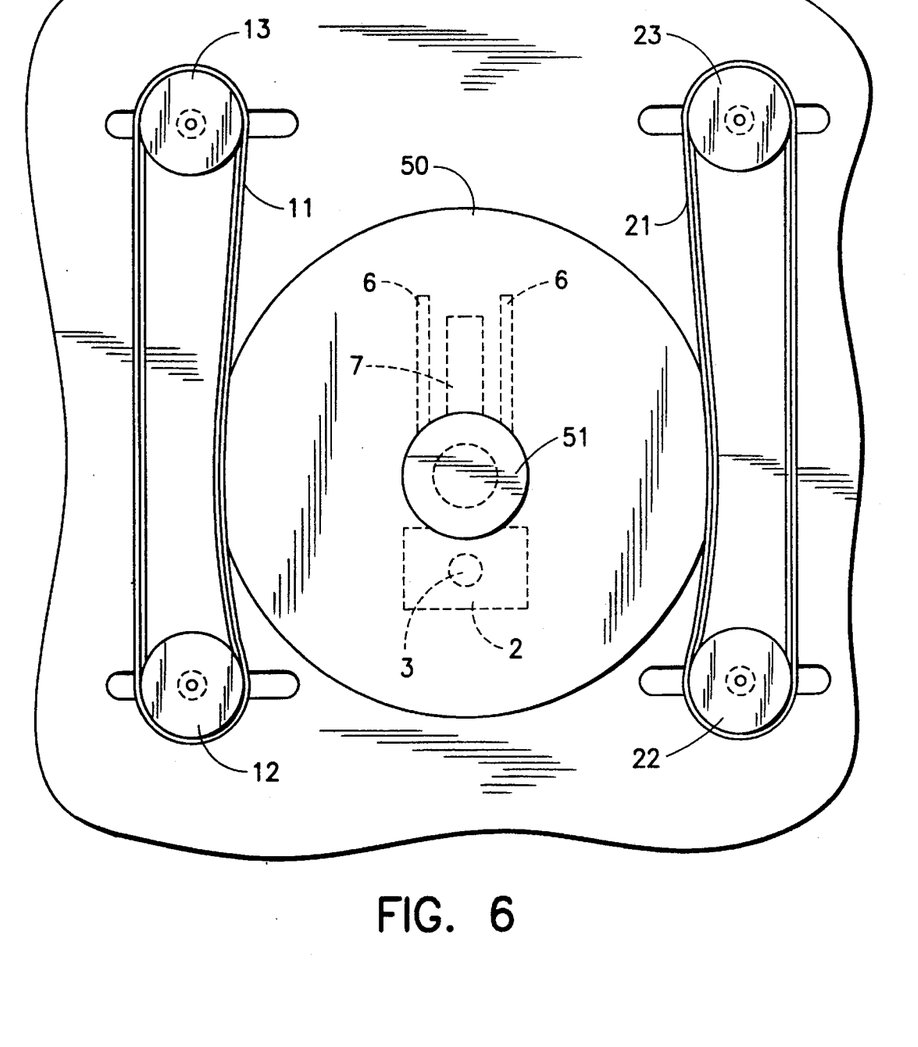
FIG. 6 is a top view of the disc playback device at the beginning of play mode.

Referring now to FIG. 6, when sliding plates 31 and 41 reach a play position, the inner apex of drive belts 11 and 21 engage the outer rim of a disc 50. Drive belts 11 and 21 are deformed by about 40° to provide a substantial contact area between themselves and disc 50. Frictional engagement is established with disc 50 by forcing belts 11 and 21 to deform inward from the presence of disc 50. Motors 35 and 45 control the rotational frequency of drive pulleys 12 and 22, respectively. When motors 35 and 45 rotate in the same direction, disc 50 rotates in the opposite direction. If motors 35 and 45 rotate at different rates, not only is disc 50 rotated, but it is also transported either forward or backward, depending on which motor is faster.

When a drive belt engages disc 50, the belt applies lateral pressure in the direction of the center of disc 50. Since drive belts 11 and 21 are substantially parallel to each other, however, the forces align in opposite directions. As a result, the forces cancel each other out, thereby preventing dislocation of disc 50 or interference with proper rotation.

The V-shaped cross-section of drive belts 11 and 21 provides a degree of lateral stability against sudden movement of tilting of the device, while, the elastic nature of drive belts 11 and 21 act as shock absorbers. Stability is further provided by a clamp (not shown in the figures), which magnetically secures disc 50 to turntable 4.

Figure 5:
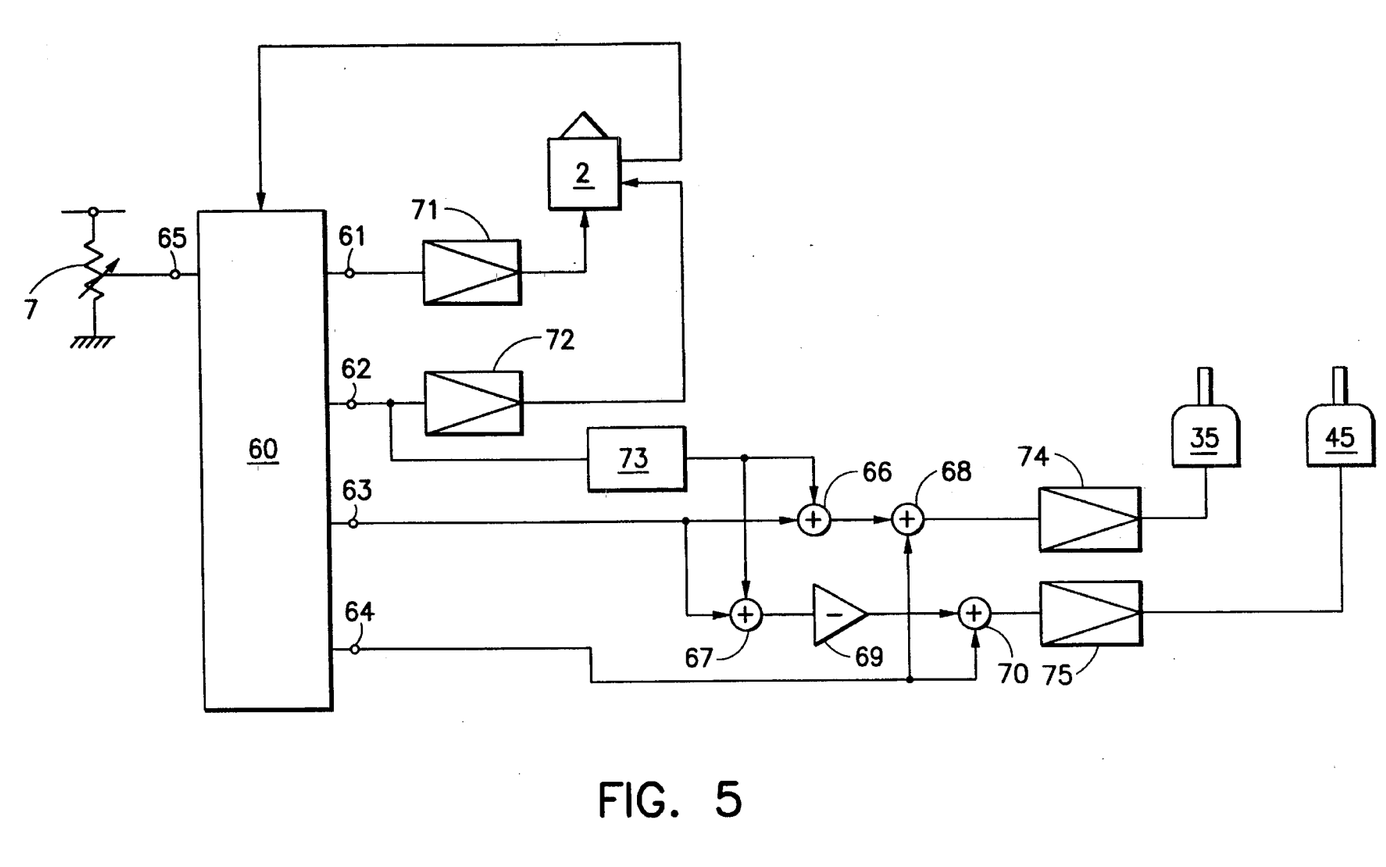
FIG. 5 is a block diagram indicating the control circuit for the present disc playback device.

Referring now to FIG. 5, a microprocessor 60 outputs control signals which regulate the voltages supplied to motors 35 and 45 and to optical pick-up 2. Microprocessor 60 receives a playback signal from optical pick-up 2 and a position signal from potentiometer 7. In response to the playback signal, microprocessor 60 produces a focus signal at terminal 61 for application through a focus motor circuit 71 to optical pick-up 2. In response to the output of focus motor circuit 71, object lens 3 (FIG. 1) is moved toward or away from the disc to image the laser (not shown) precisely on the data track, and to image the data track on the detector (not shown) in optical pick-up 2.

In addition to controlling focussing motion toward and away from the disc, microprocessor 60 produces a tracking error signal at terminal 62 which is used for tracking control in optical pick-up 2, and for disc advance using motors 35 and 45.

The tracking error signal from terminal 62 is applied to a tracking motor circuit 72. The output of tracking motor circuit 72 controls movement of optical pick-up 2 a short distance in a direction parallel to the surface of the disc in order to accommodate micro-movement between a track on the disc and the location of the laser spot.

Microprocessor 60 produces a disc drive signal at terminal 64 which is applied through adders 68 and 70 to motor drive circuits 74 and 75, respectively. In response to the disc drive signal at their inputs, motor drive circuits 74 and 75 drive motors 35 and 45 at the same speed, and in the same direction.

Referring momentarily to FIG. 6, since motors 35 and 45 are rotated in the same direction by the motor drive signal, the portion of drive belt 11 contacting disc 50 moves in one direction, while the portion of drive belt 21 contacting disc 50 moves in the opposite direction. Motors 35 and 45 rotate at the same speed in response to the motor drive signal, and therefore disc 50 is rotated in response to the motor drive signal without translation.

Returning to FIG. 5, microprocessor 60 produces a disc advance signal at terminal 63 which is applied to adders 66 and 67. The output of adder 66 is applied to adder 68. The output of adder 67 is inverted in an inverter 69 and applied to adder 70. The disc advance signal is used to advance the disc to a play position, or to a different selection. The disc may be rotating or non-rotating during advance.

The disc advance signal is applied alone, or is added to the disc drive signal applied to motor 35. Due to the inversion in inverter 69, the disc advance signal is subtracted from the disc drive signal applied to motor 45. As a consequence, the disc advance signal tends to make motors 35 and 45 rotate in opposite directions. Opposite-direction rotation of motors 35 and 45 tends to move the contact points of drive belts 11 and 21 with disc 50 in the same direction, whereby disc 50 is translated. In the presence of both the disc drive signal and the disc advance signal, disc 50 is rotated at the speed dictated by the disc drive signal while being translated (advanced) at the speed dictated by the disc advance signal.

If an average tracking error exists between a track being read and the location of the laser spot, the tracking error signal from terminal 62 contains a DC component whose polarity represents the direction of the tracking error and whose amplitude is proportional to the magnitude of the tracking error. The tracking error signal from terminal 62 is applied to a low pass filter 73 which filter out high-frequency components in the tracking error signal to produce a slowly varying DC error signal proportional to the DC component in the tracking error signal. During playing of a disc, alignment of the laser spot with the data track on the disc is accomplished using the DC error signal added and subtracted from the disc drive signals applied to motors 35 and 45, respectively.

The DC component is connected from low pass filter 73 to second inputs of adders 66 and 67. The output of adder 66 is applied to motor 35 through adder 68 and motor drive circuit 74. The output of adder 67 is applied to motor 45 through inverter 69, adder 70 and motor drive circuit 45. It will be noted that the circuit responds to the DC error signal to translate a disc in forward or reverse directions to correct tracking errors in a manner identical to the response of the circuits to the disc advance signal described above, except that the tracking operation employs closed-loop feedback from tracking errors detected in the output of optical pick-up 2.

In normal operation, belts 11 and 21 are moved into contact with the edge of disc 50. Microprocessor 60 outputs a disc advance signal at terminal 63 to advance disc 50 to its starting position. Drive motors 35 and 45 rotate in opposite directions in response to the disc advance signal, thereby advancing disc 50 along guide shafts 6.

As optical lens 3 reaches the recorded tracks on disc 50, microprocessor 60 produces the motor drive signal at output 64 to begin rotation of disc 50. Optical pick-up 2 produces a playback signal containing a conventional synchronizing signal. The synchronizing signal is phase-compared with a clock signal having a known frequency to control the motor drive signal at terminal 64. In this way, the disc rotation speed is established and maintained at the desired rate.

The signal from optical pick-up 2 also contains address signals used by microprocessor 60 in generating a disc-advance signal for controlling the output of terminal 63 to advance disc 50 to skip undesired portions of the recorded tracks, and to then play back desired portions.

Assuming that "v" is the linear speed required to read disc 50; "p" is the track pitch; "$r_i$" is the smallest radius of track within the region of recorded data; $r_t$ is the distance between the center of disc 50 and the laser of optical pick-up 2 t seconds after reading $r_i$; and $r_d$ is the radius of disc 50 then:

$$v \ast p \ast t = \pi(r_t^2 - r_i^2) \quad (1)$$

$$rt = \sqrt{ri^2 + v \cdot p \cdot t/\pi} \quad (2)$$

Based on these equations, the velocities $v_{11}$ and $v_{21}$ of drive belts 11 and 21, respectively, are as follows:

$$v_{11}t = \frac{rd}{rt} + v\frac{p}{2\pi \cdot rt} \quad (3)$$

$$v_{21}t = \frac{rd}{rt} + v\frac{p}{2\pi \cdot rt} \quad (4)$$

Unexpected movement or jarring of the device may cause disc 50 to wobble up and down. In order to keep the laser spot from optical pick-up 2 focused on disc 50, microprocessor 60 moves object lens 3 up and down via the focus servo signal to match disc movement.

Figure 7:
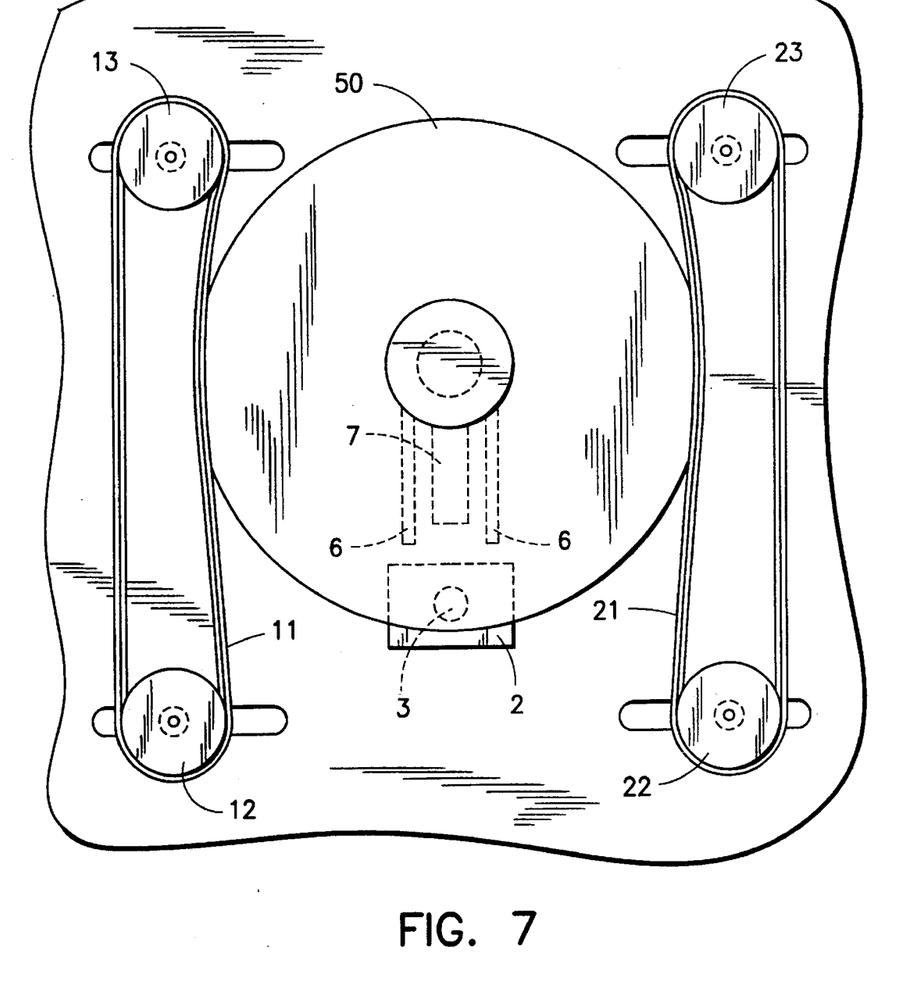
FIG. 7 is a top view of the disc playback device at the end of play mode.

When playback completes, disc 50 will have moved from the position shown in FIG. 6 to that of FIG. 7. Microprocessor 60 discontinues the motor drive signal and outputs the disc advance signal at terminal 64 to cause drive belts 11 and 21 to rotate clockwise and counterclockwise, respectively. This moves disc 50 toward the initial position, whereupon motors 35 and 45 halt. Drive source 46 moves sliding plates 31 and 41 away from turntable 4, and thereby disengage drive belts 11 and 21 from disc 50.

Figure 8:
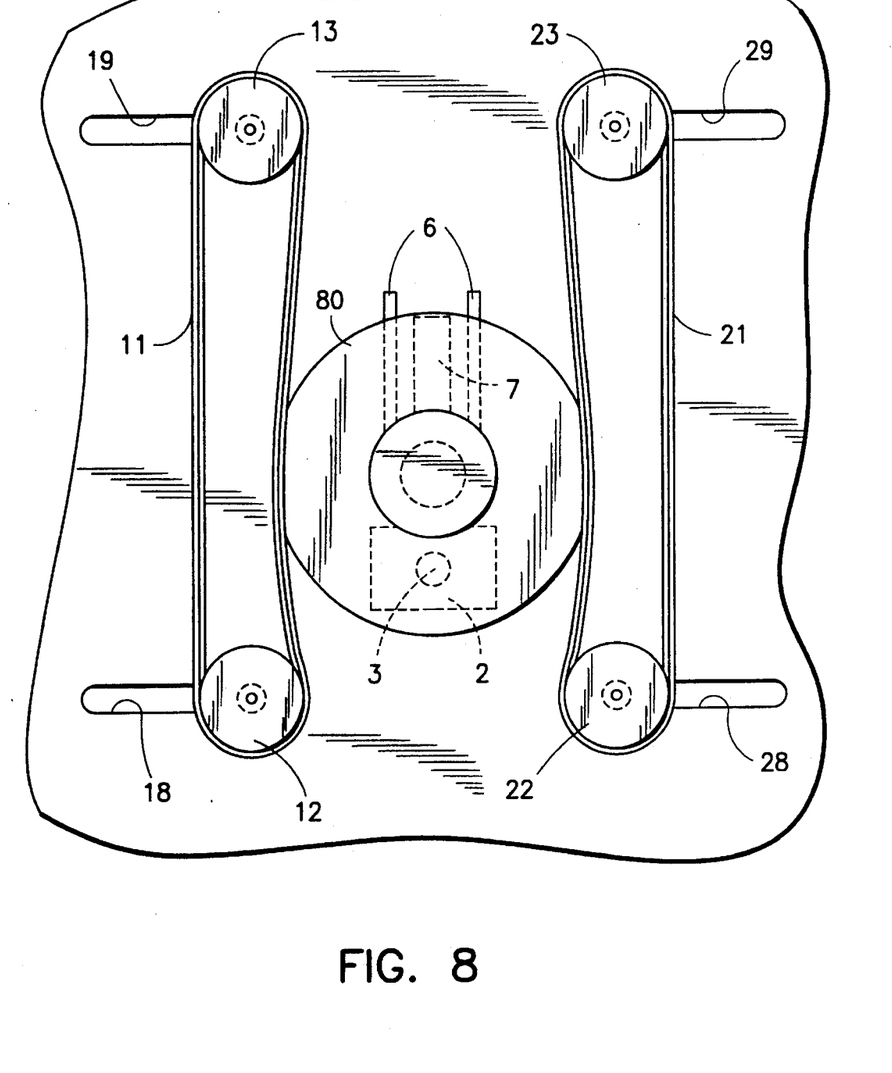
FIG. 8 is a top view of the disc playback device during play mode with an 8 cm disc.
Figure 9:
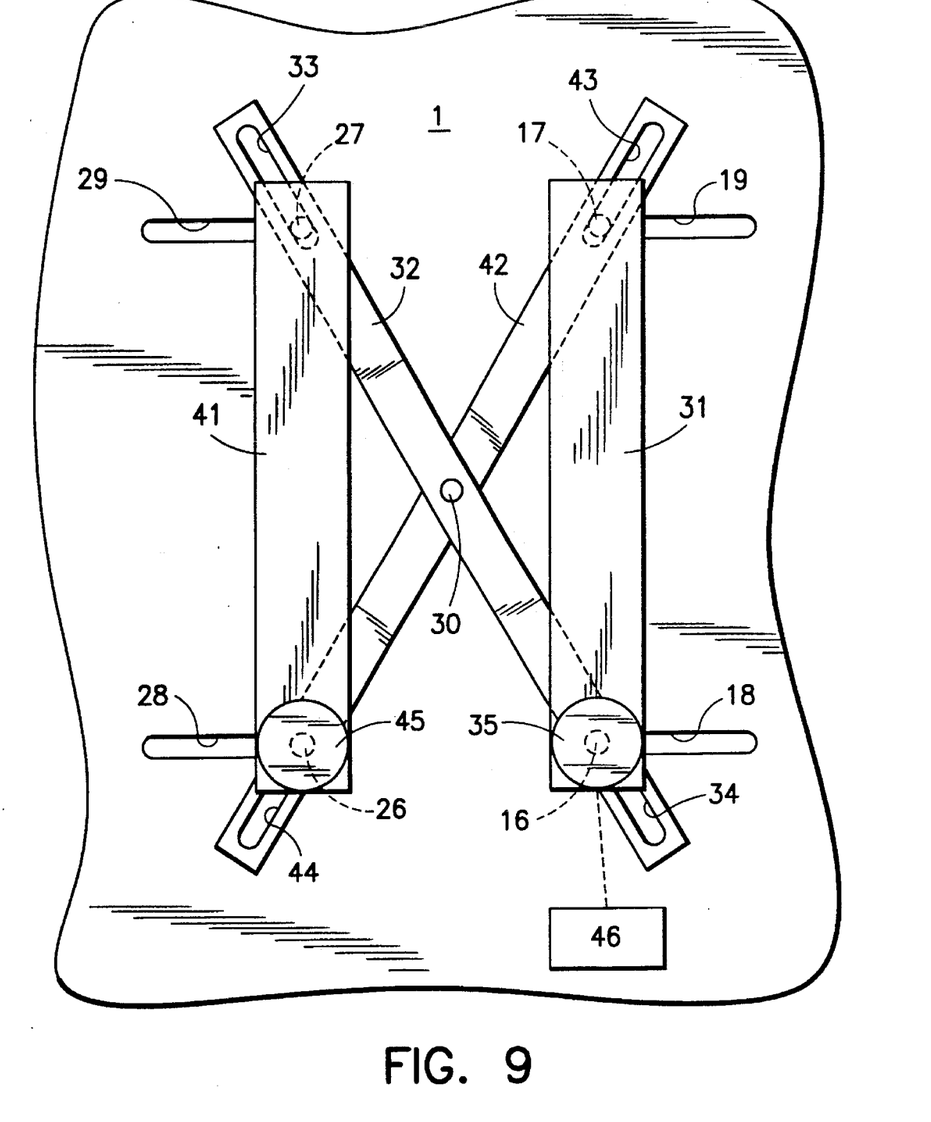
FIG. 9 is a bottom view of the disc playback device during play mode.

Referring now to FIGS. 8 and 9, the present invention is shown with an 8 cm disc 80. Disc 80 is controlled and played as described with reference to disc 50. Drive belts 11 and 21 rotate with velocities $v_{11}$ and $v_{21}$ according to equations 3 and 4. Since the radius of disc 80 is smaller than disc 50, drive belts 11 and 21 rotate at higher speeds to maintain disc 80 at the speed required for reading data contained therein.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

In one alternative embodiment, if drive belts 11 and 21 have sufficient strength and appropriate shape, they can support disc 50 without the need for turntable 4.

In another embodiment, the device employs more than two drive belts to rotate disc 50. In this embodiment, the belts are distributed around the circumference of disc 50 such that the lateral forces applied by the drive belts cancel each other out.

In a still further embodiment, drive belts 11 and 21 can move disc 50 to other operational positions. For example, drive belts 11 and 21 could move disc 50 through a slot to a position outside of the disc player for removal therefrom. In the alternative, the belts could move disc 50 to a transport mechanism for moving disc 50 between eject or storage positions within the device.

What is claimed is:

1. A friction device for rotating a disc in a disc player, comprising:

at least first and second drive belts;

at least first and second means for driving said at least first and second drive belts, respectively;

means for rotatably supporting said disc;

means for reading said disc; and said at least first and second drive belts contacting at least first and second portions of a rim of said disc such that said disc rotates responsive to said at least first and second means for driving.

2. A disc playback device according to claim 1, further comprising:

means for moving said at least first and second drive belts into contact with said disc.

3. A disc playback device according to claim 1, wherein said at least first and second portions are substantially equidistant from each other about a circumference of said disc.

4. A disc playback device according to claim 1, wherein said first and second drive belts are parallel.

5. A disc playback device according to claim 1 further comprising a control means for adjusting a speed of said at least first and second means for driving.

6. A disc playback device according to claim 1 further comprising means for increasing a speed of one of said at least first and second means for driving and for decreasing a speed of another of said at least first and second means for driving by the same amount, whereby said disc is translated in a direction parallel to its surface.

7. A disc playback device according to claim 1, wherein:
said at least first and second drive belts each has a V-shaped cross-section; and
said V-shaped cross section is fittable to an edge of said disc.

8. A disc playback device according to claim 1, wherein each of said at least first and second means for driving further comprises:
a driven pulley;
a passive pulley;
said drive belt winding around said driven and passive pulley; and
said driven and passive pulleys having V-shaped grooves to receive said drive belt.

9. A device for rotating a disc, comprising:
first and second flexible continuous loop elements;
said disc having an outer edge;
first and second means for revolving said first and second loop elements, respectively;
means for reading said disc;
means for engaging said first and second loop elements with said outer edge when said loop elements revolve, whereby said disc is rotated; and
control means for changing a rotational frequency of said first and second loop elements.

10. A disc playback device according to claim 9, wherein said first and second loop elements are disposed parallel to each other engaging opposed edges of said outer edge.

11. A disc playback device according to claim 9, wherein said first and second loop elements have a V-shaped cross-section.

12. A disc playback device according to claim 9, wherein each of said first and second means for revolving further comprises:
a driven pulley;
a passive pulley;
said respective loop element winding around said driven and passive pulley; and
said driven and passive pulleys having V-shaped grooves to receive said drive belt.

13. A disc playback device according to claim 9, wherein said means for revolving includes means for increasing the rotational frequency of said first drive belt by an amount, and for decreasing the rotational frequency of said second loop element decreases by said amount.

14. Comprising:
means for reading said disc;
first and second drive belts;
each of said first and second drive belts wrapping around first and second pulley sets;
each pulley set including a drive pulley and a passive pulley;
said first and second pulley sets being slidably mounted on first and second plates;
said first and second plates being connected such that movement in a direction of one of said plates causes a corresponding equal and opposite movement in the other of said plates;
said first and second plates having a playback position where said first and second drive belts engage an outer rim of said disc;
means for moving said first and second plates to said playback position; and
control means for adjusting the rotational frequency of said first and second drive pulleys.

15. Apparatus according to claim 14, wherein said first and second drive belts are disposed parallel to each other.

16. A disc drive comprising:
first and second belts;
means for moving said first and second belts into contact with
means for reading said disc;
disc rotation means for driving contact points of said first and second belts with said disc at the same speed, and in opposite directions, whereby said disc is rotated without translation; and
disc advance means for changing a speed of said first belt in a first direction at its contact point and for changing a speed of said second belt at its contact point in a second direction by substantially the same amount, whereby said disc is translated.

17. A disc drive according to claim 16, further comprising:
means for rotatably supporting said disc; and
means for permitting said means for rotatably supporting to translate in response to translation of said disc.

18. A disc drive according to claim 16, further comprising means for actuating said disc advance means irrespective of actuation of said disc rotation means.

* * * * *

UNITED STATES PATENT AND TRADEMARK OFFICE
CERTIFICATE OF CORRECTION

PATENT NO. : 5,561,658
DATED : October 1, 1996
INVENTOR(S) : Niro Nakamichi; Tadao Yamanouchi It is certified that error appears in the above-identified patent and that said Letters Patent is hereby corrected as shown below:

Column 5, line 5, change "filter" to --filters--.

Column 5, line 17, change "45" to --75--.

Col. 8
Claim 14, change line 1 to read:

--A device for a rotating disc, comprising:--.

Signed and Sealed this

Seventeenth Day of December, 1996

Attest:

BRUCE LEHMAN

Attesting Officer        Commissioner of Patents and Trademarks